W. V. TURNER.
SPEED REGULATED BRAKE.
APPLICATION FILED NOV. 14, 1907.

1,069,357.

Patented Aug. 5, 1913.

WITNESSES
Wm. M. Cady
J. S. Custer

INVENTOR
Walter V. Turner
by E. A. Wright
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

SPEED-REGULATED BRAKE.

1,069,357.  Specification of Letters Patent.  Patented Aug. 5, 1913.

Application filed November 14, 1907. Serial No. 402,126.

*To all whom it may concern:*

Be it known that I, WALTER V. TURNER, a citizen of the United States, residing at Edgewood, in the county of Allegheny and State of Pennsylvania, have invented new and useful Improvements in Speed-Regulated Brakes, of which the following is a specification.

This invention relates to fluid pressure brakes, and more particularly to apparatus for automatically regulating the pressure in the brake cylinder, when the brakes are applied, according to the speed of the vehicle.

It has heretofore been proposed to employ an electric generator or dynamo, adapted to be driven by the axle of a vehicle, for governing an outlet from the brake cylinder, whereby the brake cylinder pressure may be regulated according to the varying speed of the vehicle.

With apparatus of the above character, the current from the generator is employed only during applications of the brakes, and it is the main object of my invention to provide means, normally permitting the generator circuit to be open, but adapted upon an application of the brakes to close said circuit.

Figure 1:
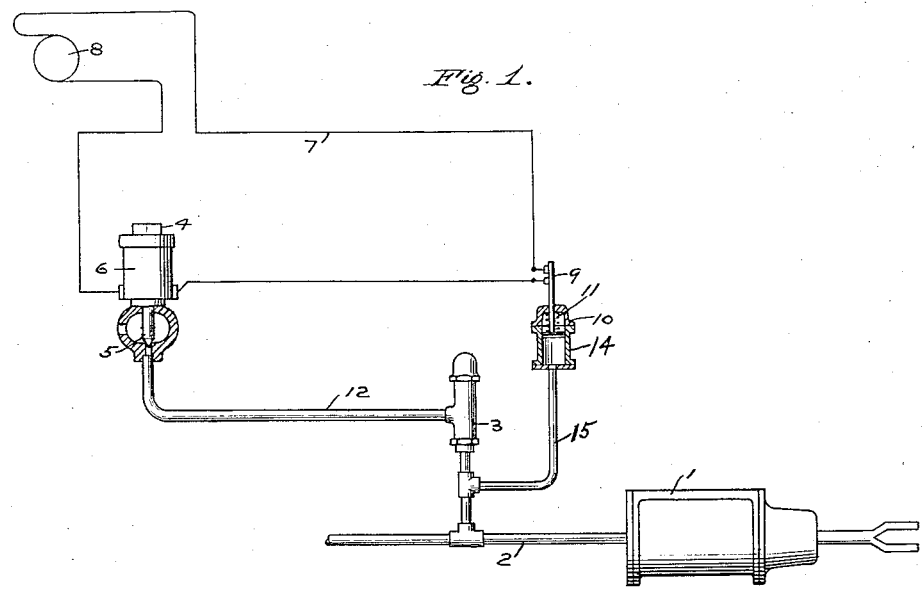
Figure 2:
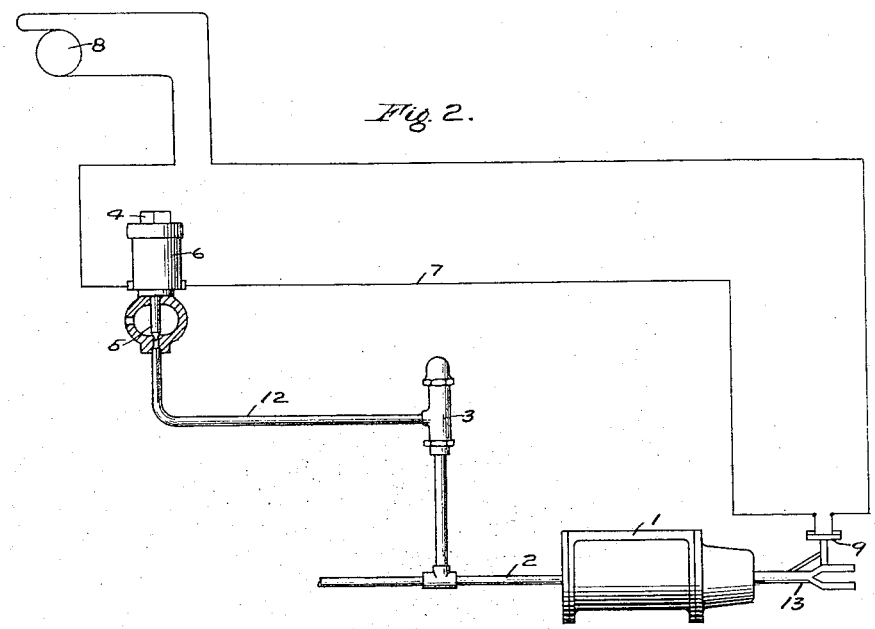

In the accompanying drawing, Figure 1 is a diagrammatic view of a brake cylinder and apparatus for regulating the brake cylinder pressure according to the speed of the vehicle, with one form of my improvements applied thereto; and Fig. 2 a similar view, showing another construction of my invention applied.

As illustrated in Fig. 1 of the drawing, the apparatus for regulating the pressure on the brake cylinder according to the speed of the vehicle, may comprise a generator or dynamo, diagrammatically indicated at 8, adapted to be driven by the axle of a vehicle, either directly or indirectly, and having a generator circuit 7 in which may be interposed the coil of an electromagnet 6. The electromagnet 6 operates a release valve 5, which controls an outlet port from brake cylinder 1, through the usual brake cylinder pipe 2, to which may be connected pipe 12, leading to said release valve 5. The varying current which is generated by the dynamo in proportion to the speed of the vehicle, correspondingly varies the degree of magnetic force of the electromagnet 6, which force tends to close the release valve 5. A blow down or safety valve 3 may be interposed in the pipe 12, if desired, so that the maximum degree of brake cylinder pressure may be limited to a predetermined amount, while the release valve 5 is adapted to hold the brake cylinder outlet closed at or above a predetermined rate of speed, and to open the same below that speed.

According to the form of my invention illustrated in Fig. 1, I provide an electric switch for the generator circuit 7, the movable part 9 of which is secured to the stem of a piston 10. The piston 10 is contained in a suitable casing 14, and has one face open to brake cylinder pressure, as by connecting the same by a pipe 15 to the pipe 12. The other side of the piston is subject to the pressure of a spring 11, adapted to normally maintain the electric switch in open position.

It will now be apparent that normally the generator circuit 7 is open, so that the generator is inactive, but upon applying the brakes, the brake cylinder pressure acting on piston 10, shifts the same and the movable part 9 of the switch, thereby closing the generator circuit. The release valve 5 is then regulated by the electromagnet 6 and the varying current produced by the generator, as the speed of the vehicle varies, as will be readily understood.

The electric switch for controlling the opening and closing of the generator current may be governed in various ways, through the action of the brake cylinder pressure, such as, for example, the form of my invention illustrated in Fig. 2, wherein the movable part 9 of the generator circuit switch is secured to the brake cylinder piston stem 13. The relative positions of the fixed and movable parts of the switch are such that normally while the brakes are released, the switch is open, but upon making an application of the brakes, the movement of the brake cylinder piston shifts the movable part 9 into contact with the fixed points of the switch and the generator circuit is closed, causing the operation of the speed governed apparatus, as previously described.

Having now described my invention, what I claim as new and desire to secure by Letters Patent is:—

1. In a fluid pressure brake, the combination with a generator driven by the momentum of the vehicle for regulating the brake cylinder pressure, of means governed by brake cylinder pressure for controlling the generator circuit.

2. In a fluid pressure brake, the combination with a generator driven from the axle of the vehicle and means governed by said generator for controlling the brake cylinder pressure, of means operated by brake cylinder pressure for closing the generator circuit.

3. In a fluid pressure brake, the combination with a generator driven from the axle of the vehicle for controlling a brake cylinder release valve, and having a normally open circuit, of an electric switch operated upon an application of the brakes to close said circuit.

4. In a fluid pressure brake, the combination with a generator driven from the axle of the vehicle for controlling a brake cylinder release valve, and having a normally open circuit, of an electric switch operated by brake cylinder pressure for closing said circuit.

5. In a fluid pressure brake, the combination with a generator driven by the momentum of the vehicle for regulating the pressure in the brake cylinder, and having a normally open circuit, of means operated upon an application of the brakes for closing said circuit.

6. In a fluid pressure brake, the combination with a generator driven from the axle of the vehicle for controlling a brake cylinder release valve, and having a normally open circuit, of an electric switch, operated by the movement of the brake cylinder piston to apply the brakes, for closing said circuit.

7. In a fluid pressure brake, the combination with a generator driven from the axle of the vehicle for controlling a brake cylinder release valve, and having a normally open circuit, of an electric switch and a piston operated by brake cylinder pressure for closing said switch.

8. In a fluid pressure brake, the combination with a brake cylinder and a release valve for said brake cylinder, of an electromagnetic device for controlling said release valve, an electric generator for varying the current to said electromagnetic device according to the speed, and a normally open switch for the generator circuit, adapted to be closed by brake cylinder pressure.

9. In a fluid pressure brake, the combination with a brake cylinder, of valve means for releasing air from the brake cylinder, a speed governed magnet for controlling said valve means, and an automatically operated switch for controlling the magnet circuit.

In testimony whereof I have hereunto set my hand.

WALTER V. TURNER.

Witnesses:
R. F. EMERY,
WM. M. CADY.